United States Patent [19]

Moser et al.

[11] Patent Number: 4,769,800

[45] Date of Patent: Sep. 6, 1988

[54] POSITIONING DEVICE FOR A SENSING HEAD OF AN OPTICAL DATA STORAGE SYSTEM

[75] Inventors: Erich Moser, Taufkirchen; Norbert Gottfried, Baldham, both of Fed. Rep. of Germany

[73] Assignee: Siemens Aktiengesellschaft, Berlin and Munich, Fed. Rep. of Germany

[21] Appl. No.: 899,893

[22] Filed: Aug. 25, 1986

[30] Foreign Application Priority Data

Aug. 27, 1985 [DE] Fed. Rep. of Germany ....... 3530597

[51] Int. Cl.$^4$ .............................................. G11B 7/08
[52] U.S. Cl. ...................................... 369/32; 369/13; 369/45
[58] Field of Search .................. 369/32, 13, 33, 41, 369/44, 45, 46; 358/907; 365/122; 360/114, 59

[56] References Cited

U.S. PATENT DOCUMENTS

| | | | |
|---|---|---|---|
| 3,898,629 | 8/1975 | Westerberg | 340/173 LT |
| 4,260,858 | 4/1981 | Beiser | 369/103 |
| 4,408,311 | 10/1983 | Suzuki et al. | 369/43 |
| 4,545,046 | 10/1985 | Jansen et al. | 369/111 |
| 4,554,653 | 11/1985 | Malissin et al. | 369/44 |
| 4,581,529 | 4/1986 | Gordon | 369/32 |
| 4,598,394 | 7/1986 | Nonaka | 369/32 |
| 4,669,073 | 5/1987 | Wakabayashi et al. | 369/45 |

FOREIGN PATENT DOCUMENTS

| | | |
|---|---|---|
| 0114082 | 7/1984 | European Pat. Off. . |
| 0143483 | 6/1985 | European Pat. Off. . |
| 0156460 | 10/1985 | European Pat. Off. . |
| 2029051 | 3/1980 | United Kingdom . |

OTHER PUBLICATIONS

Garwin, "Optics for Beam Addressable Files," IBM Tech. Discl. Bul., vol. 15, No. 2, pp. 494,495, Jul. 1972.
Patents Abstracts of Japan, vol. 7, No. 38(P-176)(1183) Feb. 16, 1983 of Japanese Patent 57-189354 (11/20/82) Kiichi Katou.
Patent Abstracts of Japan, vol. 7, No. 160(P-210)(1305) Jul. 14, 1983 of Japanese Patent 58-68248 (4/23/83) Akira Yamada.
Patent Abstracts of Japan, vol. 7, No. 206(P-222)(1351) Sep. 10, 1983 of Japanese Patent 58-102346 (6/17/83) Eiichi Hanakawa.
Patent Abstracts of Japan, vol. 8, No. 211(P-303)(1648) 9/26/1984 of Japanese Patent 59-94254 (5/30/84) Kaoru Yasukawa.
Patent Abstracts of Japan, vol. 8, No. 245(P-312)(1682) 11/10/84 of Japanese Patent 59-116947 (7/6/84) Kietsu Iwabuchi.

Primary Examiner—William H. Beha, Jr.
Attorney, Agent, or Firm—Hill, Van Santen, Steadman & Simpson

[57] ABSTRACT

A positioning device for optical data storage which has an optical system for generating a polarized, parallel laser light beam and for receiving gated out reflected light beams for evaluation and a sensing head which is radially displaceable relative to a storage disk characterized by the optical system being contained in a rigid frame mechanically decoupled from the sensing head. The system includes a pivotably mounted deflection mirror which enables fine positioning. The sensing head will include an imaging system for focussing the laser beam onto the storage disk which is resiliently hinged to the sensing head so that it is deflectable in a vertical direction for readjustment of the focussing independent of radial motion of the sensing head.

12 Claims, 3 Drawing Sheets

POSITIONING DEVICE FOR A SENSING HEAD OF AN OPTICAL DATA STORAGE SYSTEM

BACKGROUND OF THE INVENTION

The present invention is directed to a positioning device for an optical data storage. The device includes an optical system for generating a polarized, parallel laser light beam and for out coupling of a reflected light beam, an arrangement for evaluating the reflected light beam and a sensing head arranged radially movable relative to the storage disk for track selection with the effective vertical distance of the sensing head from the surface of the storage disk being variable for readjustment of the focussing of the beam.

The properties of the respective positioning devices have always played a significant part in disk storage whether they are for magnetic disk storage or optical disk storage. Technological advances have enabled an increase in the storage capacity with the increase in the track density being of particular interest but, at the same time, all possible efforts were also undertaken to shorten the mean access time in order to increase the performance capability of the respective disk storage.

Therefore, there has been no lack of attempts to satisfy the demands for short access time and a high tracking density which are contradictory per se. In a positioning system, the moved mass will always normally occur and this includes the read unit moved essentially radially relative to the storage disk. Particularly in a magnetic disk storage, advances in technology, particularly in the magnetic heads, have succeeded in substantially reducing the mass which must necessarily be moved and thus, is likewise creating faster positioning means. In optical storages, the reduction of mass is far more difficult because of the optical imaging system.

As known, relative high access speeds, for example a fast radially movement of the positioning means given track changes, can also be more easily achieved with a positioning device which is executed in multi-stages. A rough positioning of the head unit thereby occurs first whether it is a magnetic write/read head or an optical sensor an.d this rough positioning attempts to position the head to the track region as closest as possible to the data track to be selected or to this track itself. This is followed by fine positioning, which sets the head unit to the selected track and/or.holds the track position. This division of the positioning events into two steps having a high translational speed in the first phase and a precise fine adjustment in the second phase allows an access time which is optimized on average with the given boundary conditions upon employment of the two control systems.

Optical data storages are currently still frequently employed only for archiving purposes so that the mean access time given continual writing and/or reading of great data quantities still does not play a decisive part. However, if optical data storages are to compete with magnetic storage devices, for example if optical data storages are to be employable for operating modes having frequent track changes, then extremely short access times must also be provided in this type of storage.

In this context, U.S. Pat. No. 4,545,046, whose disclosure is incorporated by reference thereto and which is based on the same Dutch Patent Application as European patent application No. 0,114,082, discloses a positioning device for an optical data storage which is fashioned as a linear positioner. For example, a sensing unit is displaceably arranged on a pair of guide rods. The drive for the storage disk spindle is also provided at an end of the guide rods at the same time. In the case of an optical system for generating a read beam and for evaluating a reflected laser beam is stationarily arranged and this is also positioned at the other end of the guide rods.

Whereas the spatial alignment of modules decoupled from one another is in the foreground of the known device, it also teaches in a direction which leads away from what are referred to as integrated sensors, for example, sensors, which combine all the optical and electro-optical elements. However, the mass of the movable sensing unit is still extremely high.

Another principle for resolving this problem would be to limit the absolute path length of the read head in the track selection. An example of a trial device of this direction is known from R. L. Garwin "Optics for Beam Addressable Files", *IBM Technical Disclosure Bulletin*, Vol. 15, No. 2, July 1972, pp. 494–495. In this device, instead of a single imaging lens, a plurality of lenses are arranged next to one another and are combined in a read unit. A respective group of data tracks which, however, do not lie immediately next to one another are thus, selectable. A single data track from this group is selected via each of these lenses with differently deflected laser beams. A data track, which lies in between these single tracks, must thus be selected by mechanical radial motion of the sensing unit.

A special disadvantage of this known solution is the proliferation of the optical imaging elements including a large reflector surface in the beam path. Thus, a great mass must always be mechanically moved for spindle adjustment and track follow-up. This property or characteristic obviously limits the possible track density.

SUMMARY OF THE INVENTION

The present invention is based on an object of creating a positioning device for an optical data storage which enables short access time in that first the mass of movable parts of the positioning device is largely reduced so that a high translational speed becomes possible and secondly, the track selection or fine adjustments can occur with optimumly low mass movements.

To accomplish these goals, the present invention is directed to an improvement in a positioning device for an optical data storage which device comprises an optical system for generating a polarized, parallel laser light beam and for out coupling of a reflected light beam, means for evaluating the reflected light beam and a sensing head arranged radially movable relative to the storage track for the track selection with the effective vertical distance of the sensing head from the surface of the storage disk being variable for readjustment of the focussing of the laser beam. The improvements are that the optical system is arranged in a rigid frame and is completely mechanically decoupled from the sensing head, said optical system directing the laser light beam on a first axis at a deflection mirror which is mounted for rotation around a second axis extending perpendicular to the first axis and deflects the light substantially along a vertical tnird axis which is perpendicular to said first and second axes, said sensing head being constructed as a rotary positioner for pivoting around a pivot axis which substantially coincides with said third axis, said sensing head including means for guiding light from said pivot axis to an imaging system, said imaging system being mounted for deflection in a vertical direction, said deflecting mirror being decoupled from the sensing head so that the mass of the sensing head does not include the mass of the optical system and deflecting mirror.

This solution creates a positioning device for an optical data storage in the fashion of a rotary positioner whose beam path offers all the prerequisites for optimally reducing the mass of the parts which must be necessarily moved. The optical system arranged in the rigid frame unites all the optical devices which serve the purpose of generating a focussed, linearly polarized light ray or beam, and a gate for gating out a reflected laser beam out of this beam path. This reflected laser beam, which has been gated out, is to be evaluated with the assistance of a detector arrangement which also is included as part of this optical system. For example, the detector arrangement emits a raw data signal or, respectively, error correction signals for track selection and follow-up of the vertical focussing. The deflection mirror is arranged in the beam path between this optical system and the movable sensing unit and is decoupled from the sensing unit so that it does not contribute to the mass thereof.

The deflection mirror seated in the rigid frame is arranged rotatably by a prescribed angular range around an axis perpendicular to the beam path for fine positioning of the track position. Thus, both the vertical follow-up of the imaging system for readjustment of the focussing on the one hand and the fine positioning in a two-stage positioning system on the other hand are mechanically decoupled from the rough positioning so that an especially simple and mass reduced solution is available for the rotary positioner system for rough positioning of the laser light beam.

In addition to the necessary existing drive system for the swivel motion, the only optical elements, which the sensing unit contains, are the deflection devices for the lateral offset of the light ray and an optical imaging system for focussing this ray on the surface of the storage disk. This imaging system is hinged to the radially movable parts and is hinged resiliently in a vertical direction. A control refocussing for the compensation of focussing errors will occur because of the vertical run-out of the storage disk is thus, decoupled from the radial movement of the sensing head.

Other features, advantages and embodiments of the invention will be readily apparent from the claims and the following description as well as the drawings.

DESCRIPTION OF THE PREFERRED EMBODIMENTS

Figure 1:
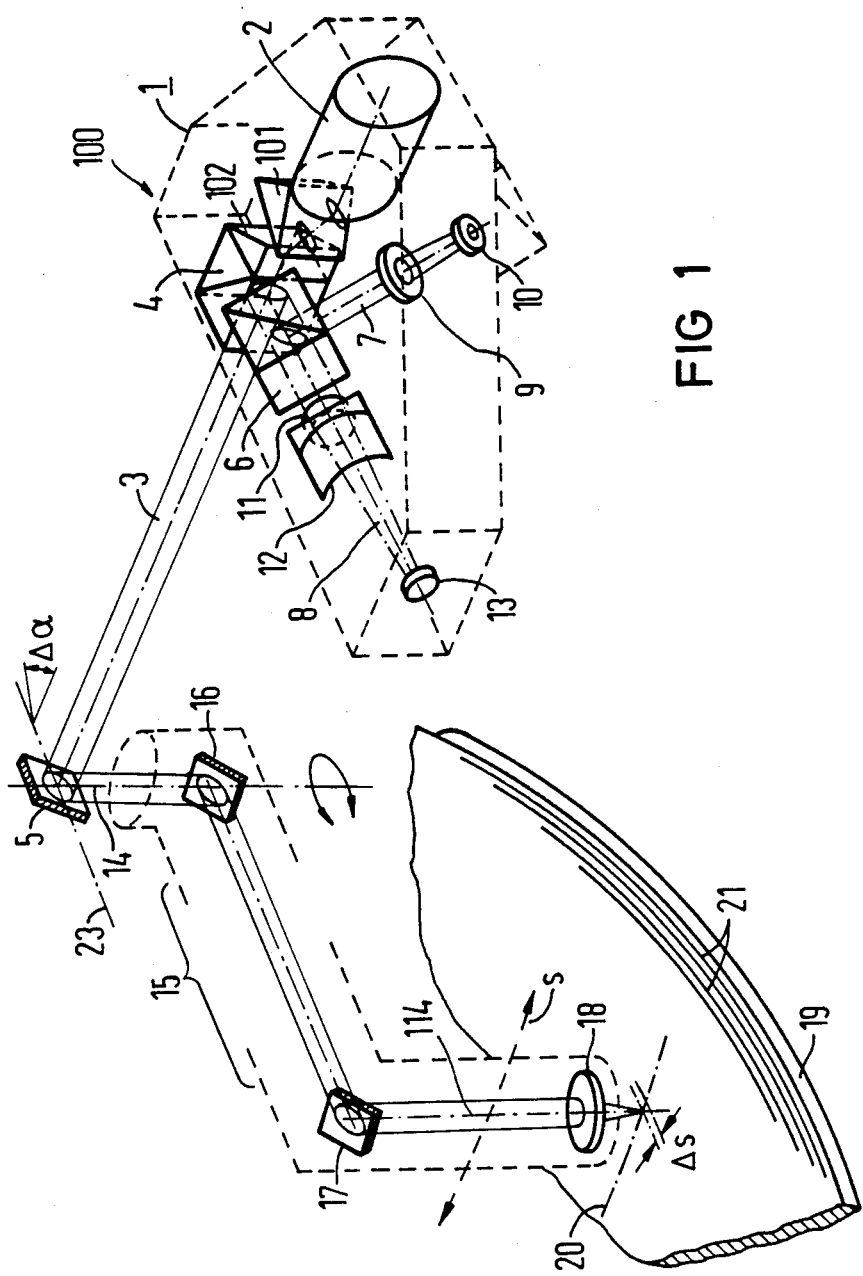
FIG. 1 is a schematic perspective three-dimensional illustration of the beam path in an optical data storage comprising a positioning device fashioned as a rotary positioner in accordance with the present invention.

The principles of the present invention are particularly useful when incorporated in a positioning device generally indicated at 100 in FIG. 1. The device 100 includes a rigid frame unit 1 which contains a full optical system for generating a parallel, linearly polarized laser light beam and also for gating or branching out and evaluating a reflected laser light beam. This optical system can be fashioned in a conventional way and is therefore, only shown schematically. It contains a laser light source 2, whose emitted, divergent and still elliptically deformed laser beam is collimated and reshaped via two prisms 101 and 102 to form a laser light beam 3 having a circular cross section. This laser light beam 3 is supplied to a polarizing beam splitter 4, which is predominantly transmissive with respect to the polarization direction of the incident, linearly polarized light beam and emits the laser light beam 3 in the direction towards a deflecting mirror 5.

The mirror 5 will also receive a reflected laser light beam and directed the reflected light beam at the polarizing beam splitter 4 which, due to the reversal of the propagation direction, then partially laterally deflects this reflected light beam. A reflected laser light beam, which has been gated out, will impinge on a second polarizer 6, which splits the received light into two linearly polarized sub-beams 7 and 8 having propagation directions perpendicular to one another. The laterally deflected sub-beam 7 is focussed by a positive lens 9 onto a first photo-detector arrangement 10. The other sub-beam 8, which the polarizer 6 allows to pass in an undeflected manner, is imaged by a further positive lens 11 and a cylindrical lens 12 onto a further or other detector arrangement 13. The two photodetectors 10 and 13 can be constructed as quadrant detectors and can thus, serve as transducers for the acquisition of electrical signals which represent the raw data signals or, respectively, track error signals or focus error signals. As mentioned, this optical system which is set forth so far can definitely be fashioned in any way conventional in the optical data storage devices so that a further detailed description thereof is believed unnecessary.

As indicated hereinabove, the focussed laser beam 3, which is emitted by the polarizing beam splitter 4 in a horizontal plane, is rotated into a vertical direction by the deflection mirror 5. This vertical direction is identical to a pivot axis 14 of a sensing head 15 which is schematically indicated in FIG. 1. With the assistance of two further or additional deflection mirrors 16 and 17, the laser light beam incident into the sensing head 15 is laterally offset and projected in an axis 114 parallel to the axis 14 and is supplied to an imaging system 18 for the sensing head 15. This imaging system is essentially composed of a collimator lens which focusses the laser light onto the surface of a storage disk 19.

Figure 2:
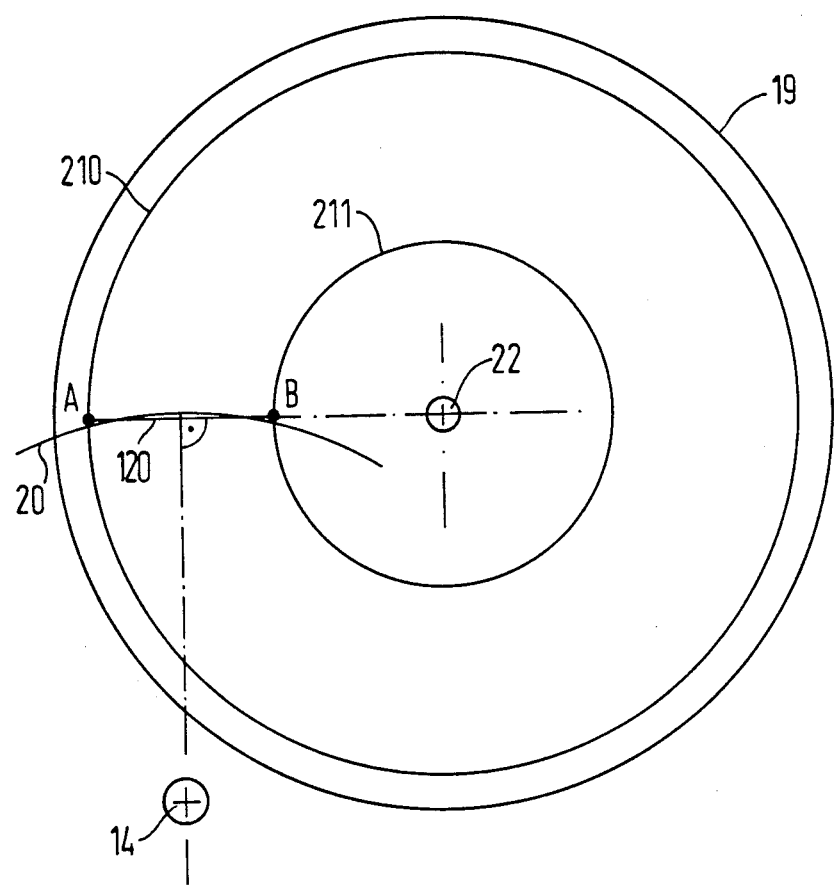
FIG. 2 is a schematic presentation of a geometrical arrangement of the rotary positioner of the present invention with respect to a storage disk.

The sensing head 15 is laterally deflected around its pivot axis 14 as indicated by the arrows and will pass through a pivot range S to form a trace 20 for the focus laser light beam 3 on a storage disk 19 in a direction which is essentially radial relative to the schematically illustrated data tracks 21. The geometry of this arrangement of the sensing head 15 relative to the storage disk 19 is schematically indicated in FIG. 2. The storage disk 19, which has an axis of rotation 22, has concentric regions occupied by data tracks 21, which are illustrated by the outermost data track 210 and the innermost data track 211. A radial beam or line 120, which intersects the outermost data track 210 at a point A and intersects the innermost data track 211 at a point B, is illustrated in FIG. 2. The pivot range S of the rotary positioner must then be adequately large so that a trace 20 of the focus laser light beam 3 at least sweeps the region between the track points A and B.

As schematically illustrated in FIG. 2, the pivot axis 14 of the sensing head 15, which has a lateral distance from the rotational axis 22 of the storage disk 19, lies on the main perpendicular bisector of the line 120 between the two points A and B. The distance of the pivot axis 14 from the radial line 120 having the two data track points A and B is then adequately selected so that the trace 20 of the focus laser beam 3 optimumly adapted to the radial line 120 between the two track points A and B intersect the later exactly twice. Although the field of the scanning tangents of the data track 21 is then not exactly parallel, the image rotations which are detectable at the photodetector 10 or, respectively, 13, which thereby occurs are still neglegible and at any rate do not cause any polarization rotation of the reflected laser beam 3.

The mirror 5 as indicated in FIG. 1 is arranged in the beam path 3 between the optical system 1 and the sensing head and is rotatable around a second axis 23 which extends perpendicular to the pivot axis 14. The pivot range of this deflection mirror is referenced Δα. As a result of such a slight tilt of the deflection mirror 5, the track point of the focussed laser beam on the storage disk 19 can be radially readjusted in this focus track 20 by an infinitesimal path length ΔS. A simple possibility for fine positioning of the laser light beam 3 decoupled from the radial pivot motion of the sensing head 5 is thus, established. The pivot motion of the sensing head 15, therefore, serves exclusively for the rough positioning of the focussed laser beam 3.

Figure 3:
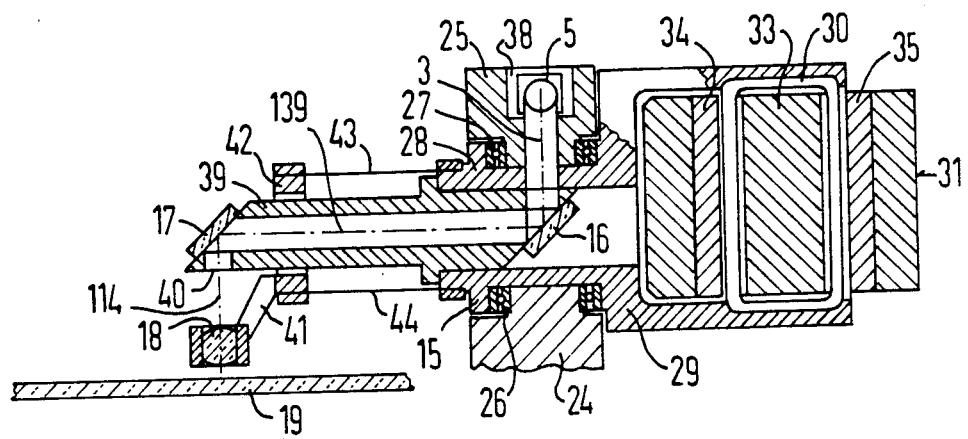
FIG. 3 is a longitudinally extending cross sectional view through the rotary positioner in accordance with the present invention; and ,,, FIG. 4 is a plan view of the rotary positioner of FIG. 3 with portions broken away for purposes of illustration.
Figure 4:
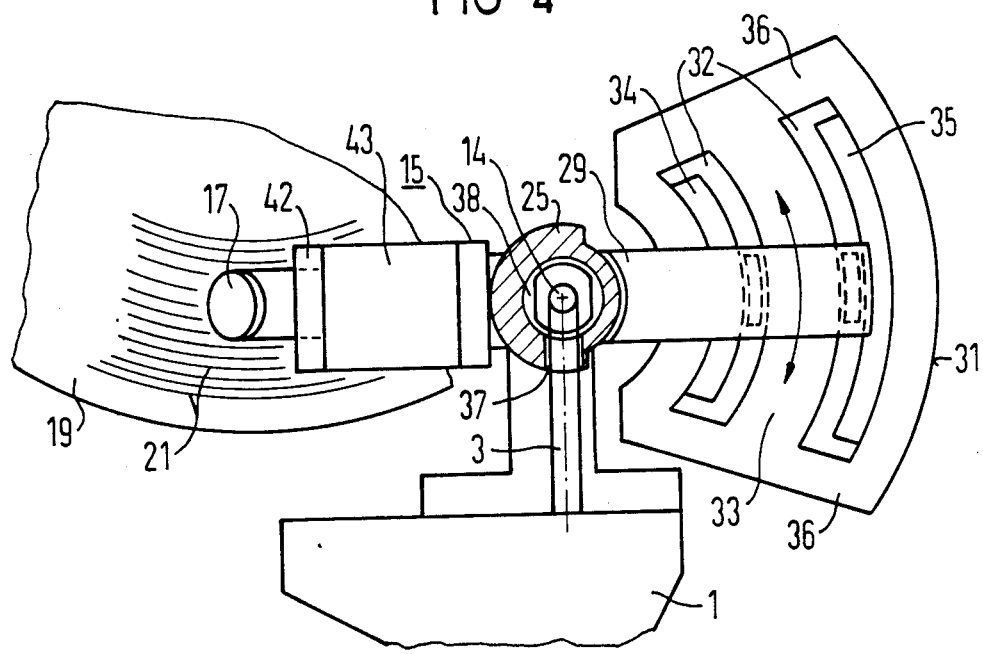

A detailed mechanical structure of the sensing head 15 is illustrated in FIGS. 3 and 4. As illustrated, the rigid-frame unit includes two pillow blocks 24 and 25 which are arranged with the pillow block 25 being positioned above the pillow block 24. A pivot member 28 is rotatably mounted on the two pillow blocks by ball bearings 26 and 27 and rotates in a horizontal plane. In the region of the bearing location, the pivot member 28 is fashioned as a hollow member and comprises a laterally salient coil arm 29 which is fashioned in a fork shape between whose ends a coil 30 for the drive of a rotary positioner is arranged.

A magnetic block 31 is provided as a companion for the coil 30. As may be seen particularly in FIG. 4, this magnetic block 3 has two arcuate groove-shaped recesses or apertures 32 which are concentric relative to one another and to the axis 14 and are separated by a curved center web 33. The coil 30 carried by the coil arm 29 embraces the center web 33 at an adequate distance so that it is freely displaceable in the pair of arcuate apertures. Next to the coil winding, appropriately fashioned permanent magnets 34 and 35 are arranged in each of the recesses. A lateral yoke member 36 completes the magnetic circuit in the rigid frame magnet block 31. For the drive of the rotary positioner, the coil 30 is excited and the power necessary to do this, for example, is fed via a flexible line not shown in detail here for reasons of clarities since it is a matter of standard structural detail.

In order to illustrate the guidance of the optical beam, FIG. 4 schematically shows that the rigid frame 1 for the optical system and the laser light beam 3 emitted therefrom. The laser light beam 3 is supplied to the sensing head 15 through a horizontal bore 37 in the upper pillow block 25. The upper pillow block 25 also has concentric to the pivot axis an enlarged blind hole 38 in which the deflection mirror 5 is arranged and is tilted to extend at 45° in its normal position relative to the horizontal lens of the laser beam 3.

As a result of the position of the mirror 5, the laser beam 3 is deflected vertically downward through the central bore of the pillow block 25 and a concentric bore in the pivot member 28. A tube-shaped mirror carrier 39 is inserted in the cavity of the pivot member 28 and has two ends which carry the deflection mirrors 16 and 17 of the sensing head 15 which mirrors are parallel to one another and, again, inclined at 45° to the axis 139 of the carrier 39. The laser light beam is thus, centrally guided in the pivot member and laterally offset relative to the pivot axis 14 to be deflected downward by the mirror 17 along an axis 114 through an opening or bore 40 in the mirror carrier 39.

The optical imaging system 18 is shown as a positive lens which is arranged concentric to the exit bore 40 and below it. This lens system is mounted in an objective carrier 41 which comprises a frame 42 that surrounds the tube-shaped mirror carrier 39 at an adequate distance. For refocussing, the optical image system 18 must be slightly displaced in the vertical direction. For this purpose, the frame 42 of the objective carrier 41 is secured to the pivot member 28 in a resilient fashion by a pair of leaf springs 43 and 44 which are arranged above and below the carrier 39.

The details of the drive system for the vertical motion of the optical imaging system 18 are not shown in FIGS. 3 and 4. Particularly, because of the slight vertical movement, however, a magnetic system can be employed for the drive. For example, this magnetic system is attached to the frame 42 of the objective carrier 41. In this way, the laser light beam emerging from the mirror carrier 39 is focussed onto one of the data tracks 21 of the storage disk 19 with the asistance of a constantly vertically readjusting image system 18.

The examplary embodiments set forth above shows that the proposed structure succeeds in largely mechanically decoupling all the control operations for the rough positioning, the fine positioning and, respectively, refocussing and, in particular, succeeds in executing all parts necessary for beam guidance in a rigid frame which parts have a significant mass. A lightweight structure of the movable parts is thus, achieved, which significantly reduces their mass moment of inertia so that a significant shorter access time as well as an improved control in the track selection, the track following and the focus follow-up are enabled with the described positioning device.

Consider from the standpoint of the optical properties the described beam guidance is independent of the rotary motion of the sensing head in a true-to-image fashion, for example, the image of the tangent of a selected data track 21 contains in the reflected light beam appears fixed on the photo-detector 10 or 13 except for slight residual error so that no special measures need be undertaken for error correction in the conversion of the reflected laser light beam into raw data signals or, respectively, track or focus error signals. An invariancy of the polarization direction of the reflected laser light beam can even be achieved with this arrangement for a positioning means when the deflection mirrors 5, 16 and 17 employed are fashioned as dielectrically coated reflectors. This is particularly significant in conjunction with the use of the described positioning device in a magneto-optical memories wherein the data information is contained in the rotation of the polarization direction of the reflected laser light beam.

Although various minor modifications may be suggested by those versed in the art, it should be understood that we wish to embody with the scope of the patent granted hereon, all such modifications as reasonably and properly come within the scope of our contribution to the art.

We claim:

1. In a positioning device for an optical data storage, said device comprising an optical system for generating a polarized, parallel light beam and for outcoupling of a reflected light beam, means for evaluating the reflected light beam, and a sensing head being arranged raidally movable relative to a storage disk for track selection with the effective vertical distance of said sensing head from a surface of said storage disk being variable, the improvements comprising the optical system being arranged in a rigid frame and being completely mechanically decoupled from the sensing head, said optical system directing the light beam on a first axis at a deflection mirror which is mounted for rotation around a second axis extending perpendicular to the first axis and deflects the light substantially along a vertical third axis which is perpendicular to said first and second axis, said sensing head being constructed as a rotary positioner for pivoting around a pivot axis which substantially coincides with said third axis, said sensing head including means for guiding light from said pivot axis to an imaging system for focussing the light beam, said imaging system being mounted for deflection in a vertical direction, said pivot axis extending parallel to a rotational axis for a storage disk and being on a perpendicular bisector of a radial extending line between a point on the outermost data track and a point on the innermost data track of the storage disk, a spacing of the pivot axis of the sensing head from said raidal line being selected with a circular trace of the focussed light beam approximating the radial line and crossing the line twice, said rigid frame including an upper pillow block and a lower pillow block vertically spaced at the pivot axis, said sensing head including a pivot member mounted for rotation in a horizontal plane between said upper and lower pillow blocks, said upper pillow block having a through bore concentric to the pivot axis, said pivot member including a coil arm cooperating with a fixedly mounted magnet, said coil being laterally salient essentially perpendicular to the pivot axis when tangential forces of exvursion for control of the pivot being exerted on said coil arm, said head including a tube-shaped mirror carrier lying opposite the coil arm, a pair of deflecting mirrors forming the means for guiding, said deflecting mirrors being provided on the outer ends of the tube-shaped mirror carrier with one of said deflecting mirrors being positioned on the pivot axis for receiving light deflected along the pivot axis by said deflection mirror and deflecting it to the other of said pair of deflecting mirrors which deflects it on an axis parallel to the pivot axis and into the imaging system, said deflection mirror being decoupled from the sensing head so that the mass of the sensing head does not include the mass of the optical system and deflection mirror.

2. In a positioning device according to claim 1, wherein the optical imaging system is mounted on the pivot member for deflectable movement in a vertical direction.

3. In a positioning device according to claim 1, wherein the fixedly mounted magnet comprises a magnetic block having a pair of circular segmented apertures separated by a center member, said magnetic coil being secured to the coil arm surrounding said center member with coil legs in each of the segmented apertures, said coil picking up control current for pivoting the pivot member.

4. In a positioning device according to claim 1, wherein the upper pillow block has an enlarged recess substantially concentric with the pivot axis, said deflection mirror being mounted in said recess.

5. In a positioning device according to claim 4, wherein the deflection mirror in the recess is arranged for rotation around of prescribed angular range $\Delta\alpha$ to selectively enable fine positioning of the track position of the focussed light beam for rapid skipping to adjacent tracks.

6. In a positioning device according to claim 1, wherein said device is employed in a magneto-optical storage, said deflection mirror and said mirrors in the means for guiding being constructed as dielectrically coated reflectors which do not influence a prescribed polarization direction of a laser light beam in the beam path.

7. In a positioning device for an optical data storage, said device comprising an optical system for generating a polarized, parallel light beam and for outcoupling of a reflected light beam, means for evaluating the reflected light beam, and a sensing head being arranged radially movable relative to a storage disk for track selection with the effective vertical distance of said sensing head from a surface of said storage disk being variable, the improvements comprising the optical system being arranged in a rigid frame and being completely mechanically decoupled from the sensing head, said optical system directing the light beam on a first axis at a deflection mirror which is mounted for rotation around a second axis extending perpendicular to the first axis and deflects the light substantially along a vertical third axis which is perpendicular to said first and second axes, said sensing head being constructed as a rotary positioner for pivoting around a pivot axis which substantially coincides with said third axis, said sensing head including means for guiding light from said pivot axis to an imaging system for focussing the light beam, said imaging system being mounted for deflection in a vertical direction, said rigid frame of the optical system having a lower pillow block and an upper pillow block mounted concentric to the pivot axis, said sensing head including a pivot member rotatably mounted on said pillow blocks for rotation in a horizontal plane, said upper pillow block including a through bore concentric to the pivot axis for passing light deflected by the deflection mirror to the means for guiding, said pivot member at one end having a coil arm which is laterally salient essentially perpendicular to the rotational axis with tangential forces excursion for control of the pivot being exerted on said coil arm, said coil arm cooperating with a fixedly mounted magnet, said pivot member opposite said coil arm supporting a tube-shaped mirror carrier having a pair of deflecting mirrors with one on each end arranged parallel to each other with the deflecting mirror on one end being positioned on the pivot axis for receiving light reflected by said deflection mirror and the other deflecting mirror of the pair being on the opposite end for deflecting light into a vertical axis offset from the pivot axis and into the imaging system, said deflection mirror being decoupled from the sensing head so that the mass of the sensing head does not include the mass of the optical system and deflection mirror.

8. In a positioning device according to claim 7, wherein optical imaging system is carried by a pivot member mounted for deflection in a vertical direction around a horizontal axis.

9. In a positioning device according to claim 7, wherein the fixedly mounted permanent magnet comprises a magnet block having a pair of circular segment apertures arranged concentric to the pivot axis with a circular segment member therebetween, said magnetic coil being secured on the coil arm surrounding said circular segment member with legs of the coils in said circular segment aperture.

10. In a positioning device according to claim 7, wherein the upper pillow block has an enlarged counter bore, said deflection mirror being mounted in said large counter bore of the upper pillow block.

11. In a positioning device according to claim 10, wherein the deflection mirror is rotatable around the second axis by an angular range $\Delta\alpha$ to enable both fine positioning of the track position of the focussed light beam and rapid skipping into adjacent tracks.

12. In a positionin9 device according to claim 7, wherein the device is utilized in a magneto-optical storage system, said deflection mirror and the mirrors of the means for guiding being constructed as dielectrically coated reflectors which do not influence a prescribed polarization direction of the laser light beam in the beam path.

* * * * *